Dec. 12, 1961 W. STAHEL 3,012,395
DAMPER FOR A SPINNING OR TWINING SPINDLE SLEEVE
HAVING A DEFORMABLE DAMPING ELEMENT
Filed July 25, 1960 2 Sheets-Sheet 2
Fig.2
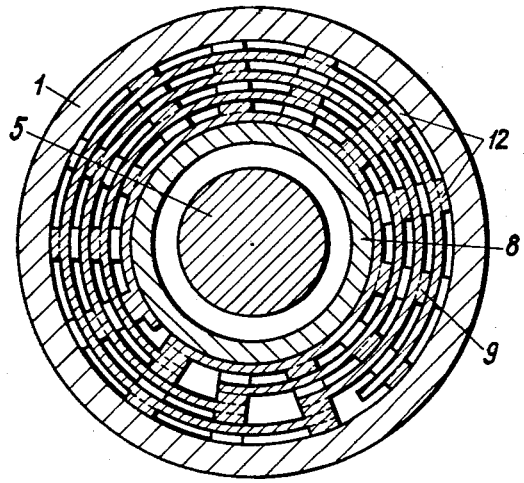
Fig.3
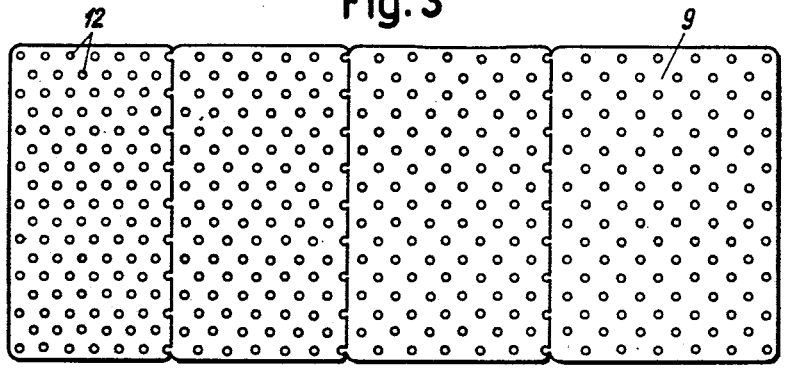
Fig.4
INVENTOR
WALTER STAHEL
By:
Wenderoth, Lind + Ponack
ATTYS.

United States Patent Office 3,012,395
Patented Dec. 12, 1961

---

3,012,395
DAMPER FOR A SPINNING OR TWINING SPINDLE SLEEVE HAVING A DEFORMABLE DAMPING ELEMENT
Walter Stahel, Zurich, Switzerland, assignor to Machine Tool Works Oerlikon, Administration Company, Zurich-Oerlikon, Switzerland
Filed July 25, 1960, Ser. No. 45,050
Claims priority, application Switzerland July 30, 1959
2 Claims. (Cl. 57—135)

The present invention relates to a damper for a spinning or twining spindle sleeve and has the principal object of resiliently taking and damping the oscillation amplitudes resulting from the yarn bobbin which is never completely balanced.

It is another object of the invention to provide a damper of the kind referred to which establishes an accurately centered guidance of the spindle sleeve with simple, inexpensive means, lending themselves to be readily produced and fitted.

With these and other objects in view which will become apparent later from this specification and the accompanying drawings, I provide a damper for a spinning or twining spindle, comprising in combination: a stationary casing in operation filled with oil, a sleeve resiliently mounted in the said casing, rotary spindle journalled in the said sleeve, and a strip-shaped damping element having a stepped development and when coiled about the said sleeve within the said casing co-axially contacting with the innermost step the said sleeve and with the outermost step the inner surface of the said casing, consecutive steps of the said damping element co-axially contacting one another.

Preferably the said strip-shaped damping element has excrescences on one of its faces, which excrescences bear on the adjacent smooth co-axial surface.

These and other features of my said invention will be clearly understood from the following description of a preferred embodiment thereof, given by way of example with reference to the accompanying drawings, in which:

FIG. 2 is a cross section on the line A—A, on a larger scale.

FIG. 3 is a development of the damping element.

FIG. 4 is a plan view of the same damping element.

Figure 1:
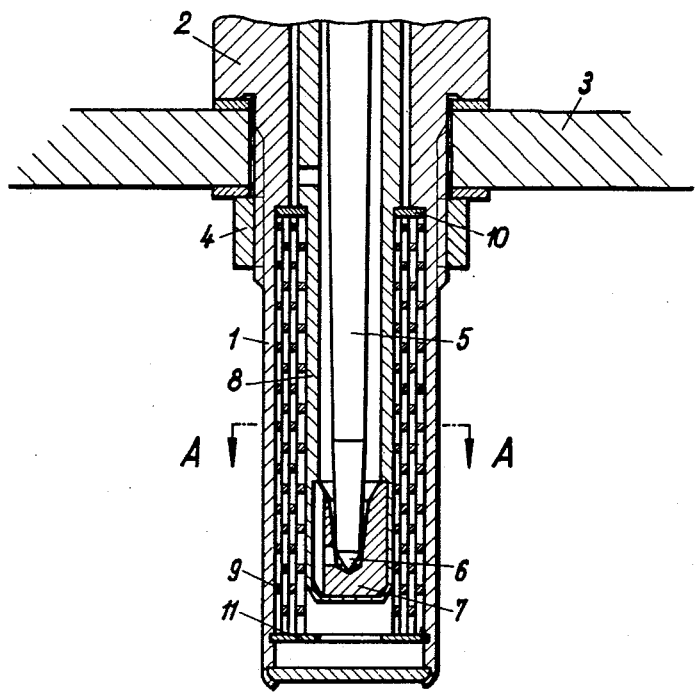
FIG. 1 is a longitudinal section of a spinning or twining spindle.

The case 1 is fixed to the spindle frame 3 by means of a shoulder 2 and a nut 4. The spindle shank 5 rests with its tip 6 on a foot bearing 7, which is fixed in the spindle sleeve 8. Between the spindle sleeve 8 and the casing 1 the damping element 9 is inserted, which is illustrated diagrammatically in FIG. 1, and is held between a resilient washer 10 and a cut-up circular clip 11.

The damping element 9 (see FIGS. 2 to 4) comprises four steps, corresponding to four windings about the spindle sleeve. Since the length of each step is slightly smaller than the circumference of the corresponding coil, each step has an accurately circular cross section. The plate-shaped damping element is provided at one side with warts, ribs or other suitable excrescences 12, which in the coiled condition bear either on the rear face of the next step or against the inner surface of the casing wall. The damping element 9 is conveniently made of synthetic rubber or any other deformable oil-resistant substance, such as a synthetic plastic material.

The interstice between the spindle and the casing is filled up to slightly beyond the height of the damping element with an oil which in the known manner communicates with the bearing chamber in the interior of the spindle sleeve through the foot bearing of the spindle.

Owing to the centered journalling of the spindle sleeve within the first step of the coiled damping element, as shown in FIG. 2, the forces reacting against a radial deviation of the spindle sleeve are equal in every direction. When owing to unbalance of the yarn bobbin or owing to the occurrence of any kind whatever of a force the spindle sleeve is radially displaced, it compresses the warts or ribs of the damping strip, thereby narrows the cavities formed by these warts or ribs and forces the oil towards the cavities on the other side, which owing to the same occurrence have been enlarged. The behaviour of the damping strip described thus combines a resilient taking of the forces with a motion damping displacement of the bulk of the oil.

While I have herein described and illustrated in the accompanying drawings what may be considered a typical and particularly advantageous embodiment of my said invention I wish it to be understood that I do not limit myself to the particular details and dimensions described and illustrated; for obvious modifications will occur to a person skilled in the art.

What I claim as my invention and desire to secure by Letters Patent, is:

1. A damper for a spinning or twining spindle, comprising in combination: a stationary casing in operation filled with oil, a sleeve resiliently mounted in the said casing, a rotary spindle journalled in the said sleeve, and a strip-shaped damping element having a stepped development and when coiled about the said sleeve within the said casing co-axially contacting with the innermost step the said sleeve and with the outermost step the inner surface of the said casing, consecutive steps of the said damping element co-axially contacting one another.

2. A damper as claimed in claim 1, wherein the said strip-shaped damping element has excrescences on one of its faces, which excrescences bear on the adjacent smooth co-axial surface.

References Cited in the file of this patent
UNITED STATES PATENTS 2,387,260    Hargreaves et al. _____ Oct. 23, 1945